Figure 1:
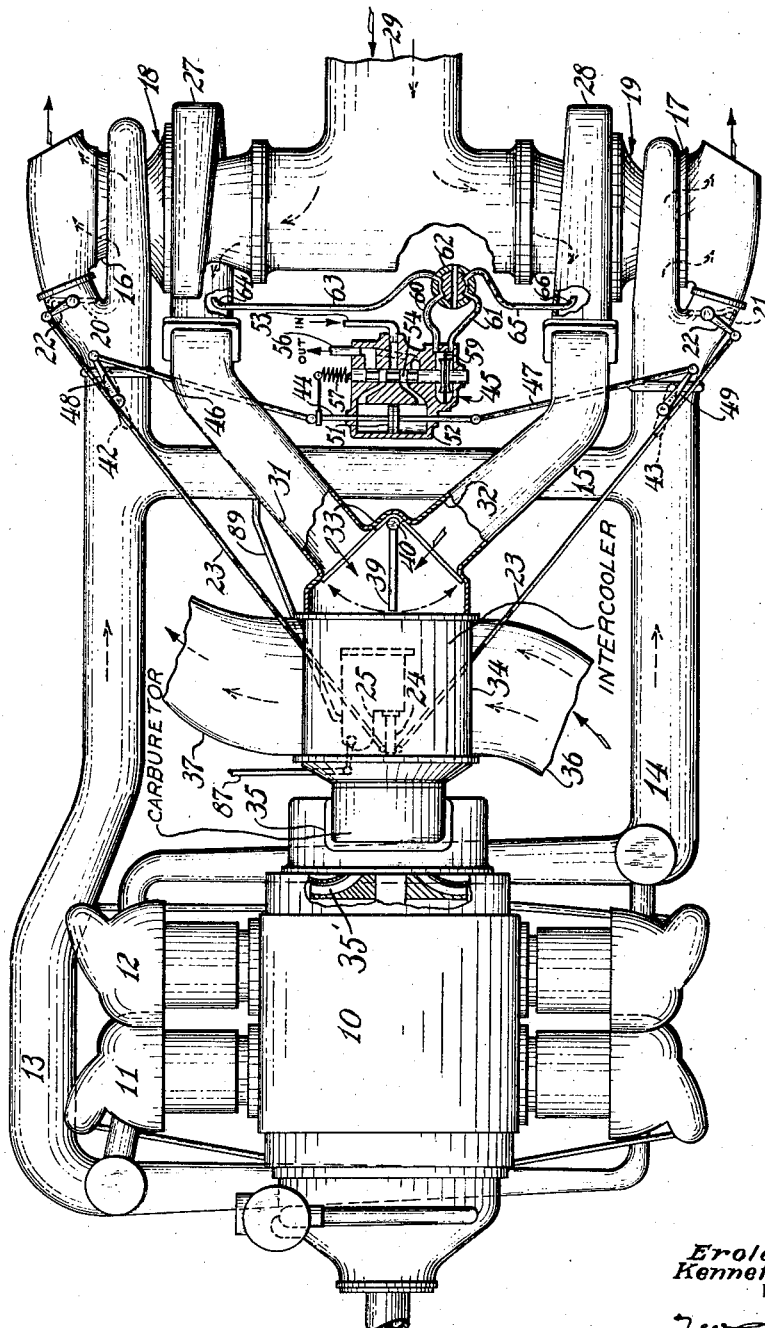

Erold F. Pierce.
Kenneth A. Browne.
INVENTORS

BY
ATTORNEY

Patented Oct. 3, 1944

2,359,615

UNITED STATES PATENT OFFICE 2,359,615

MULTISUPERCHARGER CONTROL SYSTEM

Kenneth A. Browne, Fair Lawn, and Erold F. Pierce, Paterson, N. J., assignors to Wright Aeronautical Corporation, a corporation of New York Application April 9, 1941, Serial No. 387,636

15 Claims. (Cl. 60—13)

This invention relates to power plants incorporating an internal combustion engine and a turbo-supercharger, and is concerned in particular with such equipment adapted for use in aircraft.

The use of a turbo-supercharger in connection with internal combustion engines is of course well known and briefly, the turbo-supercharger serves as a means of recovering a substantial amount of power which would otherwise be wasted in the exhaustion of hot burned gases from an internal combustion engine to the atmosphere. The turbo-supercharger includes a turbine driven at high speed by the engine exhaust gas and the turbine is directly coupled to a supercharger or blower which serves to precompress the air which is subsequently delivered to the intake system of the internal combustion engine. Turbo-superchargers have considerable utility in aircraft adapted for flight at high altitudes, where the atmospheric pressure is low and where there is a considerable useful pressure differential existing between the pressure of exhaust discharge and the pressure of the atmosphere, whereby substantial power recovery may be effected to maintain rated engine power at altitudes far in excess of the altitudes at which such rated power can otherwise be maintained.

Ordinarily, a turbo-supercharger installation consists of a single unit whose operation is controlled by a waste gate. At low altitude, the waste gate is open to permit of direct discharge of exhaust gas to the atmosphere while at high altitude, when turbo-supercharger operation is desired, the waste gate is closed to divert exhaust gas to the turbine. Control of the power afforded by the turbo-supercharger is effected by adjusting the degree of opening of the waste gate as necessary. Obviously the turbine nozzle area must be sufficient to handle the exhaust required to compress intake air for full engine power at altitude. However, most aircraft operation is done at reduced power (about 50% of maximum) and the lowest fuel consumption is obtained at reduced engine R. P. M. and relatively high intake manifold pressure. This operating condition requires about the same supercharger R. P. M. as does full power operation. Consequently, the turbine nozzle area should be reduced in proportion to the power so that exhaust gas velocity through the turbine nozzles is adequate to maintain supercharger speed and therefore, the high intake manifold pressure. Accordingly, it is an object of our invention to provide a plurality of turbo-superchargers which may be operated individually or jointly according to exhaust gas availability and according to the altitude condition.

The present state of development of turbo superchargers per se, is such that one unit may be too large in size to easily install with the present day high power engines, and two smaller units are more easily disposed in the aircraft. Accordingly, a further object of the invention is to provide a plurality of moderate sized turbo-supercharger units adapted to deliver supercharged intake air to a single large internal combustion engine. A further object of the invention is to provide a control system for a multiple turbo-supercharger installation by which one or more of the turbo-superchargers may be selected for operation. Still another object is to provide a control system for multiple turbo-supercharger units by which the output of the several superchargers is balanced. This control system prevents the overloading of one turbo-supercharger and the underloading of another.

A further object of the invention is to provide an improved form of waste gate control for a turbo-supercharger installation, this waste gate control being automatic in character and serving to maintain approximately constant supercharger discharge pressure, regardless of altitude, within the capacity of the turbo-supercharger.

Figure 2:
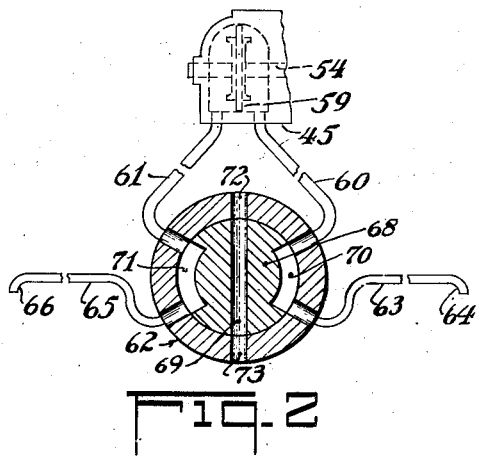
Figure 3:
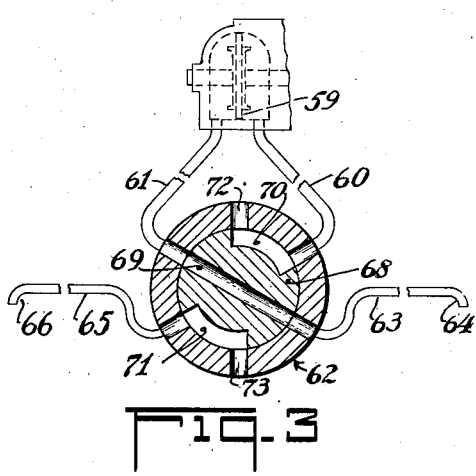
Figure 4:
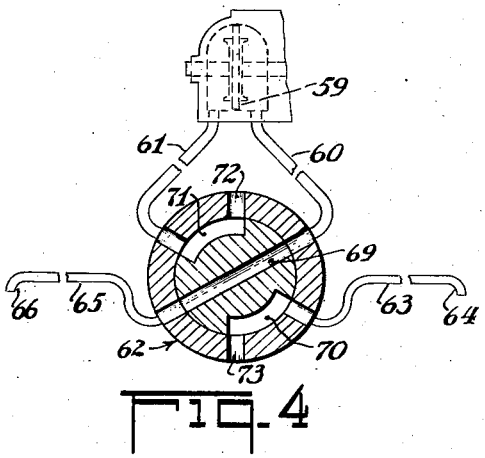
Figure 5:
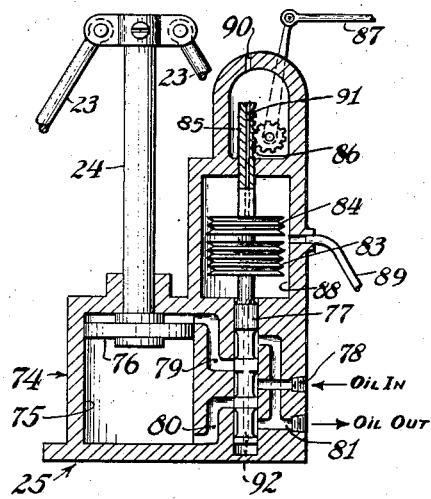

The above objects, and others, will become clearer as the more specific description of the apparatus proceeds and reference may now be made to the annexed drawings, in which:

Fig. 1 is a plan view of a power plant installation incorporating the features of the invention, part of which are shown in section;

Figs. 2, 3, and 4 are sections through a control valve of the system, shown in different positions of adjustment; and Fig. 5 is a section through the supercharger discharge pressure regulator which forms part of the invention.

Referring first to Fig. 1, 10 designates an internal combustion engine, the cylinders being arranged in a front bank 11 and a rear bank 12. The cylinder bank 11 exhausts to a manifold 13 while the cylinders 12 exhaust to a manifold 14, said manifolds being joined by a pressure and flow balancing cross connection 15 and leading to nozzle boxes 16 and 17 of turbo-supercharger units 18 and 19, respectively. A waste gate 20 is disposed in the manifold 13, while a waste gate 21 is disposed in the manifold 14, each such waste gate having an operating lever 22 and a control rod 23 leading to a piston rod 24 of a turbo-supercharger regulator 25 whose specific construction will be described in greater detail in connection with Fig. 5.

The turbo-superchargers 18 and 19 respectively include superchargers 27 and 28 having a common air intake 29 and having individual delivery ducts 31 and 32 respectively which join in a Y connection 33 which forms the entrance to an intercooler 34. Supercharged air passing through the intercooler is delivered to an engine carburetor 35 and thence through the usual engine driven supercharger 35' and intake components, not shown, to the engine cylinders. The intercooler 34 includes cooling air entrance and exit ducts 36 and 37 respectively.

In the Y connection 33 is a floating flap valve 39 pivoted at 40 which is operable to seat against the end face of and to close off conduits 31 or 32, depending upon the non delivery of air from one of the superchargers 27 or 28. That is, if the supercharger 27 is delivering air under pressure and if the supercharger 28 is inactive, the valve 39 under the influence of pressure from the conduit 31, will close upon the face of the conduit 32 thereby preventing the wastage of supercharged air by reverse flow through the inactive supercharger 28. If the supercharger 28 is active and the supercharger 27 is inactive, the valve 39 will obviously move to a position for closing the conduit 31.

As pointed out in the objects of the invention, the invention contemplates selection of one or more turbo-supercharger units for operation and furthermore contemplates an automatic balancing system to assure equal delivery by both of two turbo-superchargers when same are in operation. To this end, we provide in the manifold 13 a control valve 42, and in the manifold 14, a control valve 43. These valves are coupled together for joint operation through a piston rod 44 of a servomotor 45, by means of operating rods 46 and 47 joining respective control valves with the opposite ends of the piston rod 44. The relationship of the control valve levers 48 and 49 to the valves 42 and 43 should be substantially as shown so that, if one valve is moved to a closing position, the other valve will move through a very small angle whereby the throttle effect of the valve is negligible. When both valves 42 and 43 are balanced, they will occupy a position similar to that shown where neither exerts any substantial throttling effect on exhaust gas flow to its supercharger. By this arrangement, presuming both turbo-superchargers 18 and 19 are in operation, control effect exerted by the servomotor 45 will serve to throttle exhaust gas flow to that turbo-supercharger which is delivering more than half of the aggregate air while leaving the control valve for the other turbo-supercharger at substantially full open position, whereas, when the turbo-superchargers are delivering an equal amount of air, the respective control valves will be substantially in full open position. In explanation of the above, either throttle 42 or 43 may be moved about 15° either side of the full open position without materially affecting the exhaust pipe area, thus allowing throttle movements of 30° in this range. When moved beyond this range, however, the next 30° or more of movement will make a great deal of difference in the effective area of the pipe. It will be noted that the throttle levers 48 and 49 are angled relative to their valves. The valves are shown in position for equal passage area. If the piston rod 44 is moved to the left side of the engine a unit distance, the valve 43 will be moved toward a closed position, clockwise, through a substantial angle due to the continually diminishing radial distance, or effective lever length, from the pivot of the valve 43 to its rod 47. Concurrently, the valve 42 will be moved clockwise toward a more open position, through a small angle due to the continually increasing distance between the pivot of the valve 42 and its rod 46. Rightward movement of the rod 44 produces an opposite effect. Accordingly, though jointly moved without lost motion therebetween, one valve remains substantially full open while the other may be closed.

The servomotor 45 comprises a piston 51 on the rod 44 which is slidable in a cylinder 52. Pressure fluid such as engine pressure oil enters the unit 45 through a pipe 53 and is directed to one end or the other of the cylinder 52 by a valve 54 axially movable in the housing of the unit 45. The valve is of more or less conventional character and serves, while admitting pressure fluid to one end of the cylinder, to open the other end of the cylinder to an exit passage 56. The valve stem 54 is connected to the piston rod 44 through a follow-up spring 57 to provide damping in the servo system. The valve stem 54 is moved axially in response to the difference in pressure on opposite sides of a yielding diaphragm 59 secured within a suitable chamber in the housing of the servomotor 45, the diaphragm dividing said chamber into two cavities one of which is connected to a pipe 60 and the other of which is connected to a pipe 61. Both of these pipes lead to a selector valve 62. From the valve 62 a pipe 63 leads to a Pitot tube 64 in the delivery conduit 31 of the supercharger 27. Another pipe 65 leads from the valve 62 to a Pitot tube 66 in the delivery conduit 32 of the supercharger 28. Figs. 2, 3, and 4 show the three operating positions of the valve 62, the valve in Fig. 2 being adjusted for joint operation and automatic control of the two turbo-superchargers. The valve in Fig. 3 is adjusted for sole operation of the turbo-supercharger 18, while in Fig. 4 the valve is adjusted for sole operation of the turbo-supercharger 19.

Referring to Fig. 2 in connection with Fig. 1, the righthand Pitot tube 64 is connected to the right side of the diaphragm 59 and the left Pitot tube 66 is connected to the left side of the diaphragm 59. So long as the two Pitot tube pressures are equal, the diaphragm will be centralized, the servomotor piston 51 will be centralized, and the two turbine control valves 42 and 43 will be full open. Should the output velocity of the righthand unit 18 fall off, differential pressure will exist on the diaphragm 59 tending to move it to the right whereupon the valve stem 54 will be moved to the right, fluid pressure will be admitted to the right side of the cylinder 52 and the piston 51 will be moved to the left, thus closing the control valve 43 of the lefthand unit 19 to a degree required to equalize the output of the two superchargers. In this manner, any deviations of pressure between the two superchargers will be equalized. Should the one unit fail altogether, the other unit will obviously be closed down and the loss in manifold pressure will immediately become obvious to the pilot. Thereupon, he can move the valve 62 to either of the positions shown in Fig. 3 or 4 which affords selection of the operative turbo-supercharger.

In connection with the individual selection of turbo-supercharger units, the valve 62 includes a rotor 68 having a through drilling 69 in addition to segmental reliefs 70 and 71. In Fig. 3, the drilling 69 connects the righthand Pitot pipe 63 with the left side of the diaphragm through the pipe 61, while the right side of the diaphragm connects through the pipe 60, and the relief 70 to a vent 72. The lefthand Pitot 66 is connected to a vent 73 through the relief 71. Thus, Fig. 3 represents the position of the valve for selection of the righthand turbo-supercharger for operation. In this connection, any pressure in the lefthand Pitot 66 is isolated from the diaphragm system while pressure in the righthand Pitot 64 will be transmitted through the drilling 69 to the left side of the diaphragm 59, resulting in moving of the piston 51 to the left, fully opening the righthand turbocontrol valve 42 and fully closing the lefthand turbocontrol valve 43, whereby all exhaust gas passes to the nozzle box 16, part through the manifold 13 and part through the manifold 14 and the cross connection 15. If selection of the lefthand turbounit 19 is desired, the control valve 62 is moved to the position of Fig. 4 in which lefthand Pitot pressure is transmitted to the right side of the diaphragm through the drilling 69 while the left side of the diaphragm is vented. This causes movement of the valve stem 54 to the left with movement of the piston 51 to the right, closing the control valve 42 and opening the control valve 43.

By being able to select one or the other turbo-supercharger unit, the operational time for both units may be substantially equalized over a long period of cruising power demand.

The foregoing description in connection with the servomotor 45 applies merely to selection of one, the other, or both turbo-supercharger units and has nothing to do with the speed control of the turbo-superchargers by which substantially constant supercharger delivery pressure is maintained. This function is secured by waste gate control through the device 25 shown in detail in Fig. 5. This device is a hydraulic servomotor comprising a housing 74 defining a cylinder 75 in which a piston 76 is slidable, said piston carrying the rod 24 to which the waste gate control rods 23 are attached. The housing 74 contains a valve drilling in which a valve 77 is slidable to admit pressure oil from an inlet 78 to either the top or bottom of the cylinder 75 through passages 79 or 80 respectively. The valve 77 cooperates with an outlet passage 81 whereby, when pressure fluid is connected to the passage 79, the passage 80 is connected to the outlet 81 and vice versa. Movement of the valve stem 77 is controlled by two elastic bellows 83 and 84 serially arranged on the valve stem, the bellows 84 being connected to a rod 85 which is controllable in its axial setting by a rack and pinion connection 86, the pinion position being controllable through a rod 87 from the cockpit. A chamber 88 in which the bellows 83 and 84 are disposed is connected through a pipe 89 to any part of the exhaust manifold system 13, 14, or 15 preferably through the cross connection 15 whose pressure represents the average of exhaust pressures from both manifolds 13 and 14. The bellows 83 is evacuated and accordingly moves in response to absolute pressure changes in the exhaust manifold. The bellows 84 contains air at atmospheric pressure and thus controls the valve stem 77 in response to differential pressure between the exhaust pressure and local atmospheric pressure since the bellows 84 is vented to atmosphere through a drilling 91 in the stem 85 and through a vent 90 in the housing 74. Thus the valve stem is controlled in response to two pressure differentials, i. e., the absolute pressure of the exhaust system and the difference in pressure between the exhaust system and the atmosphere. This affords altitude compensation for the waste gate control by which substantially constant supercharger delivery pressure is maintained. If the absolute pressure control alone were used, increase in altitude would tend to increase intake manifold pressure due to reduced back pressure on the turbines whereas if atmospheric differential alone were used, the manifold pressure would tend to decrease with altitude. By serially arranging and properly proportioning the bellows 83 and 84 as shown, the resulting supercharger delivery pressure remains substantially constant regardless of power and altitude, within the capacity of the turbo-superchargers.

It will be noted that the chamber 88 containing exhaust manifold pressure is isolated from the cavity with which the vent 91 communicates and likewise, the valve stem 77 is balanced by a drilling 92 establishing communication between the chamber 88 and the bottom of the drilling in which the valve stem 77 is disposed. Valve stem movements, in a manner which is apparent, control admission of fluid to the servo cylinder 75 by which the position of the rod 24 is established and consequently the opening of the waste gates 21 and 22.

Control of the supercharging system may also be afforded by connecting the waste gate regulator pipe 89 with the intake manifold rather than the exhaust manifold. Whichever connection is used is largely a matter of choice determined by other factors not forming part of this invention. Where control pressure is taken from the supercharger delivery, the atmospheric bellows 84 is unnecessary. Where the term "turbo-supercharger pressure" is used in the claims, it is to be construed as meaning either the supercharger delivery pressure or the exhaust manifold pressure serving the turbine.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications and changes.

We claim as our invention:

1. In a power plant including an internal combustion engine having intake and exhaust manifold means, a pair of turbine driven superchargers, means connecting the turbines in parallel to the exhaust manifold means, means connecting the superchargers in parallel for delivery into said intake manifold means, throttle valve means in the exhaust connection to said turbines, and means responsive to the delivery of each supercharger for controlling said throttle valve means in order to properly divide the engine exhaust between said turbines.

2. In a power plant including an internal combustion engine having intake and exhaust manifold means, a pair of turbine driven superchargers, means connecting the turbines in parallel to the exhaust manifold means, means connecting the superchargers in parallel for delivery into said intake manifold means, throttle valve means in the exhaust connection to said turbines, means responsive to the total output head of each supercharger for controlling said throttle valve means in order to properly divide the engine exhaust between said turbines, and waste gate means for the engine exhaust operable to control the total exhaust gas flow to the turbines.

3. In a power plant system including an internal combustion engine having exhaust and intake pipes, a pair of turbo-superchargers the turbines of which are connected in parallel to the exhaust pipe and the superchargers of which are connected in parallel to the intake pipe, waste gate means in the engine exhaust for controlling turbine action, control means responsive to differences in supercharger delivery to adjust the engine exhaust flow to the respective turbines to afford equal supercharger delivery, and manual means to adjust said exhaust control means to direct exhaust gases to either turbine to the exclusion of the other.

4. In a power plant system including an internal combustion engine having exhaust and intake pipes, a pair of turbo-superchargers the turbines of which are connected in parallel to the exhaust pipe and the superchargers of which are connected in parallel to the intake pipe, a waste gate in the exhaust pipe for controlling turbine action, a selector for directing exhaust gas to one, the other, or both turbines, and means controlled by unequal air delivery by the superchargers, when both turbines are selected, to adjust the exhaust gas delivery between the turbines toward equality of supercharger delivery.

5. In a power plant system including an internal combustion engine having exhaust and intake pipes, a pair of turbo-superchargers the turbines of which are connected in parallel to the exhaust pipe and the superchargers of which are connected in parallel to the intake pipe, a waste gate in the exhaust pipe for controlling turbine action, means selectively operable to direct exhaust gas uniformly to both turbines and to direct exhaust gas to either turbine to the exclusion of the other, and means automatically operable to isolate said intake pipe from either supercharger when the other is operating by itself.

6. In a power plant system including an internal combustion engine having exhaust and intake pipes, a pair of turbo-superchargers the turbines of which are connected in parallel to the exhaust pipe and the superchargers of which are connected in parallel to the intake pipe, a waste gate in the exhaust pipe for controlling turbine action, means selectively operable to direct exhaust gas uniformly to both turbines and to direct exhaust gas to either turbine to the exclusion of the other, and a valve in the intake pipe automatically operable to close off a non-operating supercharger therefrom.

7. In a power plant, an internal combustion engine having a branched exhaust pipe, a turbine connected to each branch of the pipe, a throttle valve in each branch upstream from the associated turbine for controlling exhaust gas flow thereto, and means interconnecting said throttle valves to afford closure of either valve without materially changing the opening of the other valve, and a device responsive to differences in the total pressure delivery of the superchargers to operate said interconnecting means.

8. In a power plant, an internal combustion engine having a branched exhaust pipe, a turbine connected to each branch of the pipe, a throttle valve in each branch upstream from the associated turbine for controlling exhaust gas flow thereto, said valves being normally open, and means interconnecting said valves to close either valve without substantially affecting the opening area of the other.

9. In a power plant, an internal combustion engine having a branched exhaust pipe, a turbine connected to each branch of the pipe, a throttle valve in each branch upstream from the associated turbine for controlling exhaust gas flow thereto, said valves being normally open, means interconnecting said valves to close either valve without substantially affecting the opening area of the other, and means responsive to variations in a condition indicative of the output of each supercharger for adjusting said valves in order to properly divide the engine exhaust between said turbines.

10. In a power plant, an internal combustion engine having a branched exhaust pipe, a turbine connected to each branch of the pipe, a throttle valve in each branch upstream from the associated turbine for controlling exhaust gas flow thereto, said valves being normally open, means interconnecting said valves to close either valve without substantially affecting the opening area of the other, and a waste-gate in the exhaust pipe to control the total amount of exhaust gas delivered to said turbines.

11. In a power plant, an internal combustion engine having a branched exhaust pipe, a turbine connected to each branch of the pipe, a throttle valve in each branch upstream from the associated turbine for controlling exhaust gas flow thereto, said valves being normally open, means interconnecting said valves to close either valve without substantially affecting the opening area of the other, means responsive to variations in a condition indicative of the output of each supercharger for adjusting said valves in order to properly divide the engine exhaust between said turbines, and means to select either turbine for sole operation to the exclusion of the other comprising mechanism for completely closing one said throttle valve while leaving the other open.

12. In an internal combustion power plant, a branched exhaust pipe, a turbine connected to each branch of the pipe, a waste gate, means for controlling said waste gate responsive in its operation to the difference between exhaust pipe pressure and the pressure of a fixed quantity of elastic fluid to control the total exhaust flow to said turbines, a throttle valve in each branch of the exhaust pipe upstream of the associated turbine, means interconnecting said throttle valves for opposite operation, and a servo control for actuating said throttle valves oppositely, responsive to unbalance in the power delivered by said turbines.

13. In a power plant, a pair of turbo-supercharger units whose turbines are driven from a common motive fluid source and whose superchargers deliver their output air into a common conduit, conduit means connecting the fluid source with both turbines, waste-gate means to control the total motive fluid delivered to the turbines, a throttle valve at each turbine motive fluid entrance, and means responsive to differences between the total output head of the superchargers of the two units to control the motive fluid fed to respective turbines.

14. In a control system for a pair of fluid motors fed from a common fluid source and including a branched conduit leading from said source to said motors, a throttle valve in the conduit for each motor, movable means interconnecting said valves for joint operation, said interconnecting means having an intermediate position in which both said valves are substantially fully open and being movable in either direction from said intermediate position for substantially closing one of said valves, depending on the direction of movement, without materially changing the opening of the other valve.

15. In a power plant including an internal combustion engine having intake and exhaust manifold means, a pair of turbine driven superchargers, means connecting the turbines in parallel to said exhaust manifold means, means connecting said superchargers in parallel for delivery into said intake manifold means, and means automatically responsive to variations in a condition indicative of the output of each supercharger for properly dividing the engine exhaust between said turbines.

EROLD F. PIERCE.
KENNETH A. BROWNE.